United States Patent Office 3,310,500
Patented Mar. 21, 1967

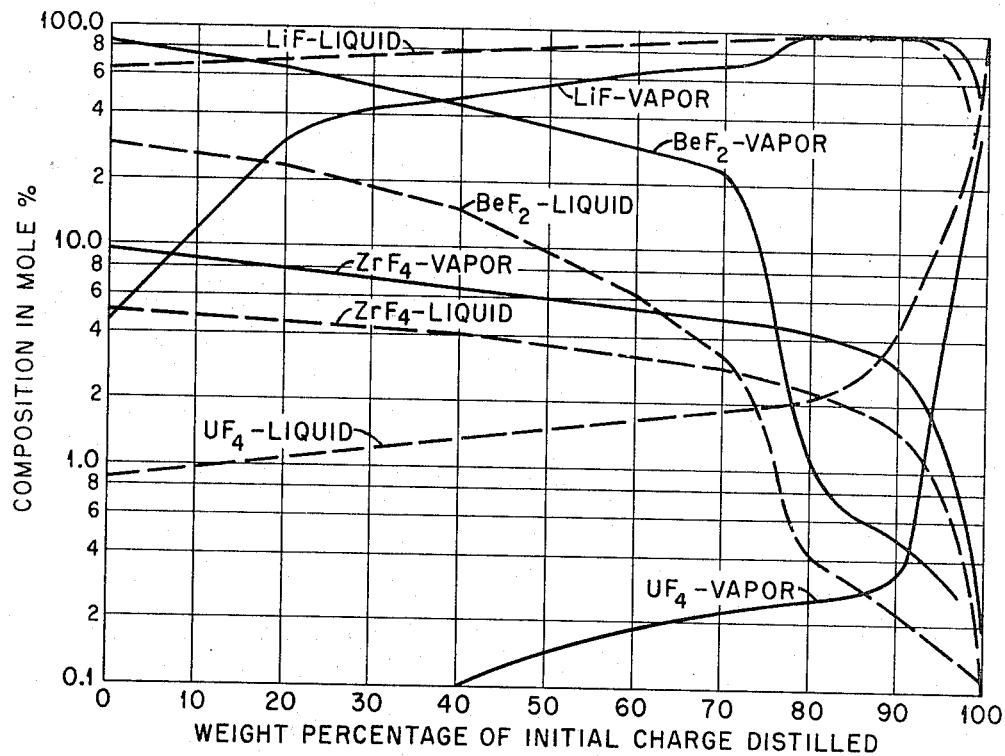

3,310,500
DISTILLATION METHOD FOR REPROCESSING MOLTEN SALT REACTOR FUELS
Minton J. Kelly, Oak Ridge, Tenn., assignor to the United States of America as represented by the United States Atomic Energy Commission
Filed Nov. 29, 1965, Ser. No. 510,477
5 Claims. (Cl. 252—301.1)

The invention described herein was made in the course of, or under, a contract with the U.S. Atomic Energy Commission.

This invention relates generally to reactor fuel reprocessing methods and more particularly to a method for removing high cross section fission products from carrier molten salts.

Fused salt mixtures as fuels in homogeneous reactors have been demonstrated and found to be especially attractive owing to the high melting temperature of the fuel, low vapor pressure and excellent stability under neutron irradiation. These salt mixtures have found utility as fuels in thermal or fast reactors which may be employed for power and/or breeder purposes, depending upon the selection of fuel composition and make up. While the use of fluid fuels affords an opportunity for continuously removing fission products and replacing fissile isotopes at power, processes hereinbefore employed generally operated batchwise or on a semi-continuous basis, and utilized the well-known volatility process for removing fuel values such as uranium along with certain volatile fission product fluorides from the salt fuel.

While a number of methods have been employed to reconstitute the volatilized uranium values back into salt fuel such as by reducing the uranium hexafluoride to uranium tetrafluoride in a hydrogenfluorine flame, there was no convenient and economical method for further decontaminating the remaining carrier salt which contained the high cross section rare earth fission products and barium, yttrium, and strontium. Heretofore the remaining carrier salt was either discarded to waste burial or reprocessed, such as for example, by HF solubility. Inasmuch as the high cross section fission products, such as the long-lived rare-earth trifluoride fission products, contribute a large proportion of the total fission product poisoning to irradiated reactor fuels, their removal is highly desirable for economic operation of molten salt reactors, particularly in the case of molten salt breeder reactors.

It is therefore a primary object of this invention to provide a method for removing high cross section fission products from spent molten salt fuels.

Another object is to provide a method for economically reprocessing molten salt reactor fuels.

Still a further object is to provide a semi-continuous process for removal of long-lived rare earth fission products as well as soluble metal fission products from spent molten salt reactor fuels.

The objects of this invention are accomplished by vacuum distilling the spent molten salt fuels. Applicant has discovered that by conducting a vacuum distillation of the spent salt fuel the fluoride salts, such as for example LiF and $BeF_2$, composing the fuel carrier may be efficiently distilled away from the high cross section fission products. Where, for example, a $LiF-BeF_2-ZrF_4-UF_4$ carrier salt was vacuumed distilled between 950° and 1100° C. and at a pressure of about 1000 microns of Hg, separation factors greater than 50 with recovery of essentially 100% of the carrier salt were obtained. This method is especially useful in the decontamination of spent molten salt fuels from high cross section rare-earth fission products and calcium fluoride, strontium fluoride, and yttrium flouride.

In carrying out the method of this invention the spent molten salt, such as for example $LiF-BeF_2-UF_4$, is vacuumed distilled at an elevated temperature. It should be apparent that in order to successfully vacuum distill the salt fuel components (i.e., LiF and $BeF_2$) away from the fission product poisons, a temperature should be employed which will afford appreciable vapor pressures for the various constituents. For this a temperature within the range of 950°–1100° C., preferably about 1050° C., has been found to be quite satisfactory. With regard to the vapor pressure of the various salt mixtures, at 1050° C. for example, the vapor pressure of a 65 LiF-30 $BeF_2$-5 $ZrF_4$ (mole percent) salt mixture is 16.4 mm. of Hg while a 90 LiF-7.5 $BeF_2$-2.5 $ZrF_4$ (mole percent) is 1.65 mm. of Hg. This may be contrasted with the measured vapor pressure (in mm. of Hg) at 1050° C. for the pure salt component of the above salt mixture which are: LiF—0.92, $BeF_2$—122, $UF_4$-5.5, $ZrF_4$-4300, and $PrF_3$-0.013 (typical for any rare earth fission product).

The vacuum under which the distillation is carried out should be less than about 100 microns Hg, preferably about 10–20 microns Hg. At this pressure and temperature the distillation proceeded at a reasonably rapid rate, and yet the corrosion rates were sufficiently low to be accommodated by existing corrosion resistant alloys.

The distillation may be carried out in any suitable distillation still and may be a simple tubular still heated with a vertical tube furnace. By this arrangement the spent salt, after being heated to operating temperature, is caused to distill over from the heated section of the still to the cool section which extends outside of the tube furnace by evacuating the still down to a low pressure. Evacuation of the still may be accomplished by any convenient vacuum means, such as by a mechanical pump which should preferably be capable of pulling a vacuum at operating temperature of from 10–20 microns of Hg at the pump inlet. Conventional means may be employed and should preferably be capable of maintaining the salt charge at a temperature of from 950°–1100° C.

The method of this invention may be employed as a single stage decontamination process or may be integrated into an overall continuous close-coupled reprocessing system. Where employed as a single stage decontamination process the spent salt fuel, such as $LiF-BeF_2-ZrF_4-UF_4$, is charged to the still and heated to an operating temperature of about 1000° C. The still is then evacuated to a pressure about 10–20 microns Hg, whereupon distillation of the salt components is initiated. Due to the differences in the relative volatilities of the constituents of the salt fuel, the distillation proceeds in a batch-wise fashion. Referring to the sole drawing which indicates the vapor-liquid relationship at various stages of distillation for the salt mixture of $LiF-BeF_2-ZrF_4-UF_4$, it may be seen that the $BeF_2$ which has a vapor pressure 100 times that of LiF is the first to distill over and is followed by the LiF, while the $UF_4$ does not start to distill over until about 40% (by weight) of the initial charge is distilled. It should be noted that salt constituents cannot be effectively separated from the $ZrF_4$ due to its intermediate volatility. However, where $ZrF_4$ is contained in spent molten salt, it may be prevented from distilling from the distillation still by precipitating out the zirconium as $ZrO_2$ by the addition of a more reactive oxide. Further, the fission poisons of Xe and Kr cannot be removed by this method but are generally removed continuously during reactor operations and therefore present no problem in the present process.

Depending upon the temperature of the cool section of the distillation apparatus, the decontaminated salts, i.e., LiF, BeF$_2$, and ZrF$_4$, may be distilled over and collected as a liquid or as a solid. Where the distilled salts are desired in a liquid state, the product collector should be maintained at a temperature above the liquidus temperature for the particular salt. For LiF-BeF$_2$ mixture of reactor interest, the collector may be maintained at a temperature above about 500° C. On the other hand the distilled salts may be condensed and collected as a solid by maintaining the collector below the liquidus temperature of the salt. To prevent condensing in the transfer line the line is maintained at a temperature above the melting point of any constituent.

When the distillation operation is terminated, the bulk of the fission product poisons, such as the rare earths and SrF$_2$, BaF$_2$, YF$_3$ and that fraction of metals such as Nb, Mo, Ru, Rh, and Pb which is suspended in the metallic state in the salt, along with about 30% UF$_4$ are contained in the still pot. The UF$_4$ can be removed from the remaining high cross section, fission products by fluorinating the mixture with fluorine gas using the fluoride volatility process to convert the UF$_4$ to volatile UF$_6$. Where such a step is employed the off-gas product contains not only UF$_6$ but certain volatile fission product fluorides such as molybdenum, ruthenium, and technetium. The volatile UF$_6$ may conveniently be separated from such volatile fission product fluorides by sorption of the off-gas product in a sodium fluoride bed followed by heating the bed to about 400° C. to remove the UF$_6$ which is reversibly absorbed on the sodium fluoride bed from the fission product fluorides which are irreversibly absorbed on the bed. The remaining fission products, i.e., those not removed by volatilization with fluorine gas, may be accumulated in the still bottoms and discharged on a time cycle that will be determined by the heat generation rate. A typical time cycle for a 1000 mw.(e) molten salt breeder reactor, which is fueled with a LiF-BeF$_2$ and is processed on a continuous basis at a processing rate of about 15 ft.$^3$/day of salt may consist of from 10–60 days.

On the other hand, the process may be used in an overall continuous reprocessing such as that disclosed in co-pending application Ser. No. 510,466, now Patent No. 3,278,387 in names of Leonard E. McNeese and Charles D. Scott for "Fuel Recycle System in a Molten Salt Reactor." There, the present method may be utilized to further decontaminate the effluent carrier salt from the fluorinator to provide purified carrier salt for the reductor. The present method would thus be used to separate the carrier salt components from the high cross section fission products, such as the rare earth fluorides, and accordingly would provide a close-coupled continuous method for reprocessing spent molten salt fuels.

Further illustration of the quantitative aspects and procedures of the present invention is provided in the following examples. Example I and II demonstrate the feasibility of decontamination of typical molten salt fuels from rare earth trifluorides.

*Example I*

A tubular still, heated by a conventional vertical tube furnace, was charged with 100 grams of fused LiF-BeF$_2$-ZrF$_4$-UF$_4$ contaminated with 0.2 weight percent EuF$_3$ under an inert gas blanket of helium. The mixture was heated at atmospheric pressure to 1060° C. in the tube furnace. When temperature was achieved, the tubular still was evacuated to a pressure of less than 0.5 mm. of Hg and the LiF, BeF$_2$, and ZrF$_4$ salts distilled from the heated section of the still to the cool section which extended outside of the tube furnace.

Several samples were taken by distilling under vacuum conditions for a predetermined time which varied from 10 to 20 minutes. The distillation run was terminated by flooding the system with helium at atmospheric pressure. Rare earths were determined by activation analysis and all other values determined by wet chemical analysis. From this data a separation factor ($Sf$=mass in system/mass delivered) was calculated for the run. A second run using about 68 grams of the same salt mixture spiked with 0.1 weight percent EuF$_3$ was made using the same procedure and techniques as employed in the first run. The results are shown in Table I and Table II below for two separate runs wherein a separation factor of about 50 was obtained in the first run and a separation factor of 130 in the second.

TABLE I

| Components | Charged, Wt. Percent, Grams | Recovered [1] | | Left Behind | |
|---|---|---|---|---|---|
| | | Grams | Percent | Grams | Percent |
| LiF | 37.8 | 35.18 | 100 | 0.0014 | 0 |
| BeF$_1$ | 35.2 | 32.26 | 100 | 0.0008 | 0 |
| ZrF$_1$ | 19.5 | 18.89 | 100 | 0.003 | 0 |
| UF$_4$ | 7.3 | 5.18 | 80 | 1.33 | 20 |
| EuF$_3$ | 0.2 | [2] 0.003 | 2 | [2] 0.15 | 98 |
| Unknown [3] | | 5.38 | | 0.49 | |
| Total | 99.7 | 96.89 | 98.1 | 1.89 | 1.9 |

[1] On basis of material remaining in still.
[2] As metal by activation and analysis.
[3] Material recovered but not accounted for by analysis.

TABLE II

| Components | Charged, Wt. Percent, Grams | Recovered [1] | | Left Behind | |
|---|---|---|---|---|---|
| | | Grams | Percent | Grams | Percent |
| LiF | 76.4 | 47.01 | 98.6 | 0.64 | 1.4 |
| BeF$_2$ | 1.6 | 1.19 | 100 | 0.0 | 0.0 |
| ZrF$_4$ | 10.4 | 6.89 | 99.9 | 0.008 | 0.1 |
| UF$_4$ | 11.5 | 2.38 | 39.1 | 3.70 | 60.9 |
| EuF$_3$ | 0.1 | [2] 0.0004 | 0.8 | [2] 0.052 | 99.4 |
| Unknown [3] | | 3.05 | | 0.34 | |
| Total | 67.6 | 60.53 | 89.8 | 4.74 | 7.0 |

[1] On basis of material remaining in still.
[2] As metal by activation and analysis.
[3] Material recovered but not accounted for by analysis.

*Example II*

A 100 gram batch of salt consisting of 10.9 LiF, 6.3 BeF$_2$, 10.9 ZrF$_4$ and 5.1 UF$_4$ (wt. percent) was spiked with 270 p.p.m. La, 141 p.p.m. Sm, 673 p.p.m. Nd, 17 p.p.m. Gd, and 391 p.p.m. Ce as trifluorides. The mixture was charged to the still and distilled at a temperature of 950° C. to 1070° C. at less than 0.20 mm. of Hg. When 92% of the carrier salts had been distilled, results showed that a separation factor of over 100 for Sm had been obtained.

While the present invention has been described as a batch operation, it will be appreciated that the process could be carried out on a semi-continuous operation and be applicable to a wide range of molten salt compositions which serve as fuels for thermal or fast molten salt reactors.

What is claimed is:

1. A method for reprocessing spent molten salt reactor fuels containing fission products therein comprising vacuum distilling at a system pressure less than 100 microns Hg said molten salt to thereby effect a separation of said salt from said fission products.

2. The method of claim 1 wherein said molten salt comprises a fluoride carrier and said fission products consisting of rare earth trifluorides.

3. The method of claim 1 wherein said molten salt comprises LiF-BeF$_2$-UF$_4$.

4. The method of claim 1 wherein said vacuum distillation is carried out at a temperature within the range of 900° C–1100° C. and at a pressure of 10–20 microns.

5. The method of claim 1 wherein said vacuum distillation is carried out at a temperature of about 1050° C. and a pressure of 1 micron of Hg.

References Cited by the Examiner

UNITED STATES PATENTS 2,758,023  8/1956  Bareis _____ 176—49

FOREIGN PATENTS 222,123  6/1959  Australia.

OTHER REFERENCES

AEC Document, ORNL–3591; May 1964, pp. 232–233.

CARL D. QUARFORTH, *Primary Examiner.*

BENJAMIN R. PADGETT, *Examiner.*

S. J. LECHERT, Jr., *Assistant Examiner.*